United States Patent
Rule et al.

(10) Patent No.: US 11,720,937 B2
(45) Date of Patent: Aug. 8, 2023

(54) METHODS AND SYSTEMS FOR DYNAMIC PRICE NEGOTIATION

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 98 days.

(21) Appl. No.: 16/907,843

(22) Filed: Jun. 22, 2020

(65) Prior Publication Data

US 2021/0398175 A1 Dec. 23, 2021

(51) Int. Cl.
*G06Q 30/00* (2023.01)
*G06Q 30/0283* (2023.01)
*G06N 20/00* (2019.01)
*G06F 16/9535* (2019.01)
*G06Q 30/0207* (2023.01)
*G06Q 50/18* (2012.01)

(52) U.S. Cl.
CPC ..... *G06Q 30/0283* (2013.01); *G06F 16/9535* (2019.01); *G06N 20/00* (2019.01); *G06Q 30/0236* (2013.01); *G06Q 50/188* (2013.01)

(58) Field of Classification Search
CPC ........... G06Q 30/0283; G06Q 30/0236; G06Q 50/188; G06F 16/9535; G06N 20/00
See application file for complete search history.

(56) References Cited

U.S. PATENT DOCUMENTS

| 7,497,369 B2 | 3/2009 | Dalzell et al. |
| 9,600,822 B2 | 3/2017 | Pyle et al. |
| 2005/0197897 A1* | 9/2005 | Veit ............. G06Q 30/0283 705/14.24 |
| 2008/0184349 A1* | 7/2008 | Ting ............. H04L 9/3231 726/7 |

(Continued)

OTHER PUBLICATIONS

M. Q. Saeed, Z. Bilal and C. D. Walter, "An NFC based consumer-level counterfeit detection framework," 2013 Eleventh Annual Conference on Privacy, Security and Trust, 2013, pp. 135-142, doi: 10.1109/PST.2013.6596047. (Year: 2013).*

(Continued)

*Primary Examiner* — Sun M Li
(74) *Attorney, Agent, or Firm* — Bookoff McAndrews, PLLC

(57) ABSTRACT

A computer-implemented method for negotiating a price of a product for a user may comprise obtaining an identification of the user via a device associated with the user; obtaining social influence data of the user based on the identification of the user, wherein the social influence data of the user includes a net promoter score or a social ranking of the user; obtaining purchase parameter data of the user based on the identification of the user, wherein the purchase parameter data of the user includes a credit score, an income range, or a transaction history of the user; determining a user-specific price of the product based on the purchase parameter data and the social influence data using a trained machine learning model; and transmitting, to the user, a notification indicative of the user-specific price.

20 Claims, 4 Drawing Sheets

(56) References Cited

U.S. PATENT DOCUMENTS

| | | | |
|---|---|---|---|
| 2012/0029990 A1* | 2/2012 | Fisher | G06Q 30/06 705/41 |
| 2012/0178366 A1* | 7/2012 | Levy | H04W 74/06 455/41.1 |
| 2013/0041860 A1* | 2/2013 | Lawrence | G06N 20/00 706/46 |
| 2013/0166436 A1* | 6/2013 | Eze | G06Q 40/025 705/38 |
| 2013/0166540 A1* | 6/2013 | Ganesh | G06Q 30/02 707/722 |
| 2015/0100398 A1* | 4/2015 | Narayanaswami | G06Q 30/0236 705/14.1 |
| 2015/0242930 A1* | 8/2015 | Greystoke | G06Q 30/0631 705/26.7 |
| 2016/0155156 A1* | 6/2016 | Gopal | G06Q 30/0236 705/14.66 |
| 2017/0287038 A1* | 10/2017 | Krasadakis | G06Q 30/0201 |
| 2020/0126129 A1* | 4/2020 | Lkhamsuren | G06N 20/00 |
| 2020/0134651 A1* | 4/2020 | Perry | G06Q 30/0208 |
| 2020/0351561 A1* | 11/2020 | Spencer | H04N 21/835 |

OTHER PUBLICATIONS

J. Lohokare, R. Dani and S. Sontakke, "Automated data collection for credit score calculation based on financial transactions and social media," 2017 International Conference on Emerging Trends & Innovation in ICT (ICEI), 2017, pp. 134-138, doi: 10.1109/ETIICT.2017.7977024. (Year: 2017).*

Security Analysis of Near-Field Communication (NFC) Payments Dennis Giese, Kevin Liu, Michael Sun, Tahin Syed, Linda Zhang May 16, 2018 arXiv:1904.10623v1 [cs.CR] Apr. 24, 2019 (Year: 2018).*

A. Vinothini and S. B. Priya, "Survey of machine learning methods for big data applications," 2017 International Conference on Computational Intelligence in Data Science(ICCIDS), Chennai, India, 2017, pp. 1-5, doi: 10.1109/ICCIDS.2017.8272638. (Year: 2017).*

M. J. Viamonte, C. Ramos, F. Rodrigues and C. Cardoso, "Simulating the Behaviour of Electronic Marketplaces with an Agent-Based Approach," IEEE/WIC/ACM International Conference on Web Intelligence (WI'04), Beijing, China, 2004, pp. 553-557, doi: 10.1109/WI.2004.10046. (Year: 2004).*

* cited by examiner

US 11,720,937 B2

METHODS AND SYSTEMS FOR DYNAMIC PRICE NEGOTIATION

TECHNICAL FIELD

Various embodiments of the present disclosure relate generally to analysis of social influence data and purchase parameter data of a user (e.g., a customer), and, more particularly, to negotiating a price of a product for the user.

BACKGROUND

Negotiating a price of products and/or services offered for sale by a merchant can be unsatisfying and time-consuming for a user. Typically, a user is limited to negotiation via face-to-face communication with personnel of the merchant. However, such interaction may be uncomfortable for one or more parties of the negotiation, and may not take into account all factors which might impact a result of the negotiation.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for negotiating a price of a product for a user.

In an aspect, a computer-implemented method for negotiating a price of a product for a user may comprise obtaining an identification of the user via a device associated with the user, wherein the identification of the user comprises at least one of an actual name, a username, or a password of the user; obtaining, via one or more processors, social influence data of the user based on the identification of the user, wherein the social influence data of the user includes a net promoter score or a social ranking of the user; obtaining, via the one or more processors, purchase parameter data of the user based on the identification of the user, wherein the purchase parameter data of the user includes a credit score, an income range, or a transaction history of the user; determining, via the one or more processors, a user-specific price of the product based on the purchase parameter data and the social influence data using a trained machine learning model; and transmitting, to the user, a notification indicative of the user-specific price.

In another aspect, a computer-implemented method for negotiating a price of a product for a user may comprise obtaining an identification of the user via a device associated with the user, wherein the identification of the user comprises at least one of an actual name, a username, or a password of the user; analyzing, via one or more processors, the identification of the user to obtain purchase parameter data of the user, wherein the purchase parameter data of the user includes a credit score, an income range, or a transaction history of the user; comparing, via the one or more processors, the identification of the user to a social identification of the user; obtaining, via the one or more processors, social influence data of the user based on the social identification of the user, wherein the social influence data of the user includes a net promoter score or a social ranking of the user; determining, via the one or more processors, a user-specific price of the product based on the purchase parameter data and the social influence data using a trained machine learning model; transmitting, via the one or more processors, a notification to the user indicative of the user-specific price; and receiving, via the one or more processors, a user request to negotiate the user-specific price.

In yet another aspect, a computer system for negotiating a price of a product for a user may comprise a memory storing instructions; and one or more processors configured to execute the instructions to perform operations including obtaining an identification of the user via a device associated with the user, wherein the identification of the user comprises at least one of an actual name, a username, or a password of the user; obtaining social influence data of the user based on the identification of the user, wherein the social influence data of the user includes a net promoter score or a social ranking of the user; obtaining purchase parameter data of the user based on the identification of the user, wherein the purchase parameter data of the user includes a credit score, an income range, or a transaction history of the user; determining a user-specific price of the product based on the purchase parameter data and the social influence data using a trained machine learning model; and transmitting, to the user, a notification indicative of the user-specific price.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as purchase parameter data and social influence data may be used to determine a user-specific price of a product that a user wants to purchase. A user then may accept the user-specific price or start a renegotiation process.

Figure 1:
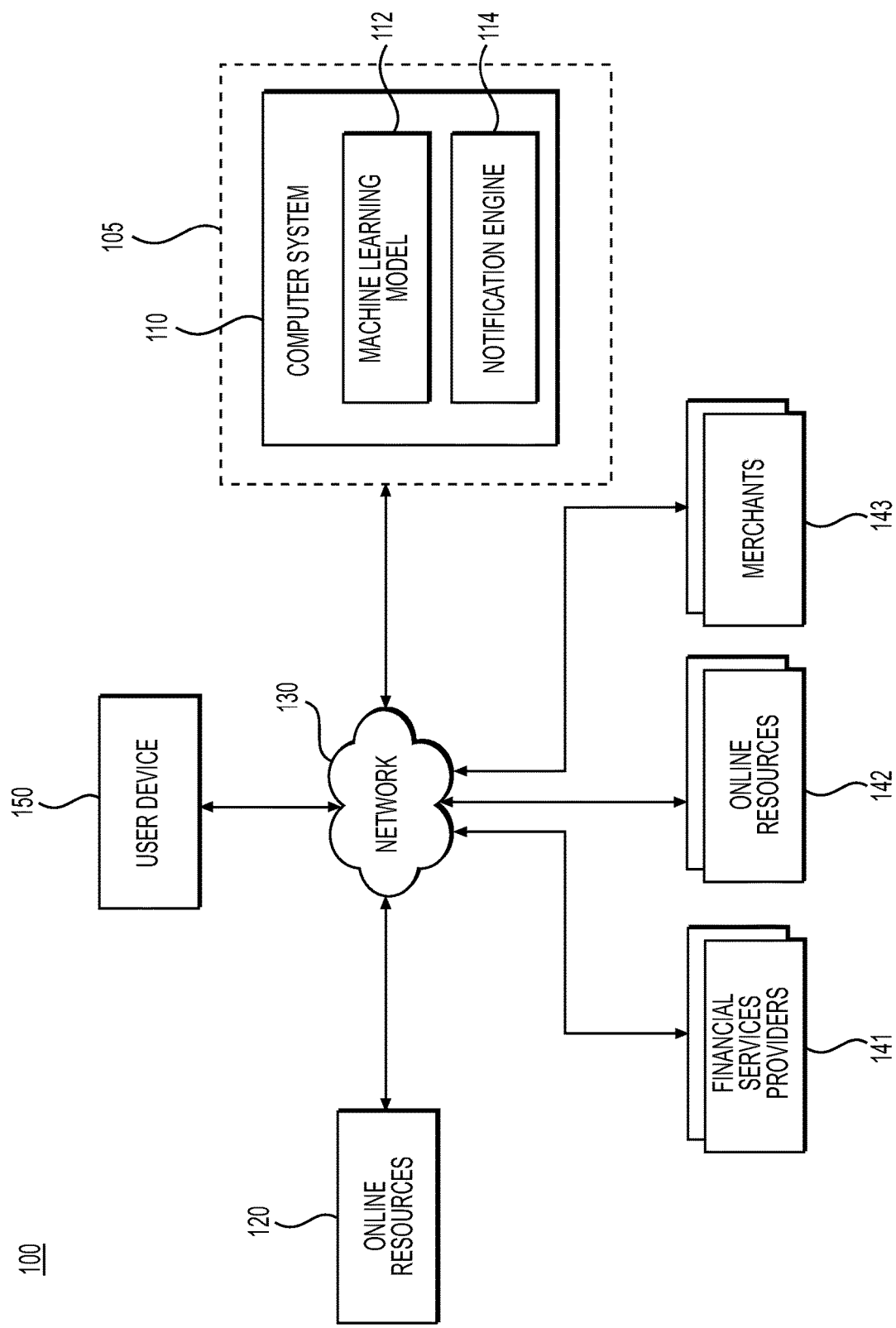
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, online resources 120, a network 130, one or more resources for collecting purchase parameter data 141-143, and a user device 150. The one or more resources for collecting purchase parameter data may include financial services providers 141, online resources 142, and merchants 143. These components may be connected to one another via the network 130.

The computer system 110 may have one or more processors configured to perform methods described in this disclosure. The computer system 110 may include a machine learning model 112 and a notification engine 114, which may each be software components stored in the computer system 110. The computer system 110 may be configured to utilize the machine learning model 112 and/or notification engine 114 when performing various methods described in this disclosure. Machine learning model 112 may be a plurality of machine learning models. Details of machine learning model 112 are described elsewhere herein. In some examples, the computer system 110 may have a cloud computing platform with scalable resources for computation and/or data storage, and may run one or more applications on the cloud computing platform to perform various computer-implemented methods described in this disclosure.

Computer system 110 may be configured to receive data from other components (e.g., online resources 120, financial services providers 141, online resources 142, merchants 143, and/or a user device 150) of the system environment 100 through network 130. Computer system 110 may further be configured to utilize the received data by inputting the received data into the machine learning model 112 to produce a result. Information indicating the result may be transmitted to user device 150 over the network 130. In some examples, the computer system 110 may be referred to as a server system that provides a service including providing the information indicating the result to user device 150. The computer system 110 may comprise other components that facilitate the operation of various execution modules (not shown). These modules may include, for example, interface/API modules, a user identifier module, a purchase history module, or a transaction tracker module. The interface/API modules may provide a web interface, an API, or another type of interface facilitating access by the user. The user identifier module may be configured to perform an identification or authentication process disclosed elsewhere herein. The purchase history module may be configured to retrieve, store, and/or manage past transactional data for a plurality of users. The transaction tracker module may be configured to retrieve, store, and/or manage current or future transactional data for a plurality of users.

The online resources 120 may include online vendors, webpages, e-mails, or social network sites. The online resources 120 may be configured to provide social influence data and may provide any information regarding a user, including, but not limited to, a user's profile (e.g., gender, age, social status, list of friends, contacts, calendar, etc.), user's preferences (e.g., hobbies, aspirations, etc.), user's online and offline activities, a number of user's followers, a time stamp, a geographic location, and proximity information to other users.

Network 130 may be any suitable network or combination of networks and may support any appropriate protocol suitable for communication of data to and from the computer system 110. Network 130 may include a public network (e.g., the Internet), a private network (e.g., a network within an organization), or a combination of public and/or private networks. The network 130 may comprise one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some examples, financial services providers 141 may include one or more merchant services providers that provide merchants 143 with the ability to accept electronic payments, such as payments using credit cards and debit cards. Therefore, financial services providers 141 may collect and store purchase parameter data pertaining to transactions occurring at the merchants 143.

Online resources 142 for providing purchase parameter data may include webpage, e-mail, apps, or social network sites. For example, online resources 142 may include electronic transaction data (e.g., electronic receipts) held by a user or other parties. Online resources 142 may be provided by manufacturers, retailers, consumer promotion agencies, and other entities. Online resources 142 may include other computer systems, such as web servers, that are accessible by computer system 110.

Merchants 143 may each be an entity that provides products. In this disclosure, the term "product," in the context of products offered by a merchant, encompasses both goods and services, as well as products that are a combination of goods and services. A merchant may be, for example, a retailer, a grocery store, an entertainment venue, a service provider, a restaurant, a bar, a non-profit organization, or other type of entity that provides products that a consumer or a user may consume. A merchant 143 may have one or more venues that a consumer or a user physically visits in order to obtain the products (goods or services) offered by the merchant.

The merchants 143 and financial services providers 141 may each include one or more computer systems configured to gather, process, transmit, and/or receive data. In general, whenever any of the merchants 143 and financial services providers 141 is described as performing an operation of gathering, processing, transmitting, or receiving data, it is understand that such operation may be performed by a computer system thereof. In general, a computer system may include one or more computing devices, as described in FIG. 4 below.

User device 150 (or a device associated with the user) may operate a client program, also referred to as a user application, used to communicate with the computer system 110. This user application may be used to provide information to the computer system 110 and to receive information from the computer system 110. In some examples, the user application may be a mobile application that is run on the user device 150. User device 150 may be an electronic mobile device (e.g., smartphone, tablet, pager, personal digital assistant (PDA)), a computer (e.g., laptop computer, desktop computer, server), or a wearable device (e.g., smartwatches). User device 150 can also include any other device capable of providing or rendering data, such as a card with token stored on it. User device 150 may optionally be portable. User device 150 may be handheld. User device 150 may be a network device capable of connecting to a network, such as the network 130, or other networks such as a local area network (LAN), wide area network (WAN) such as the Internet, a telecommunications network, a data network, or any other type of network. User device 150 may be utilized to obtain identification of the user and/or authenticate the user. User device 150 may be a card. The card may be a financial transaction card such as a credit card or a debit card, a membership card, a reward card, or an identification card such as a driver's license. Details of the card are described elsewhere herein.

Computer system 110 may be part of entity 105, which may be any type of company, organization, or institution. In some examples, the entity 105 may be a financial services provider. In such examples, the computer system 110 may have access to data pertaining to consumer transactions through a private network within the entity 105. For example if the entity 105 is a card issuer, entity 105 may collect and store transactions involving a credit card or debit card issued by the entity 105. In such examples, the computer system 110 may still receive transactional data from other financial services providers 141.

Figure 2:
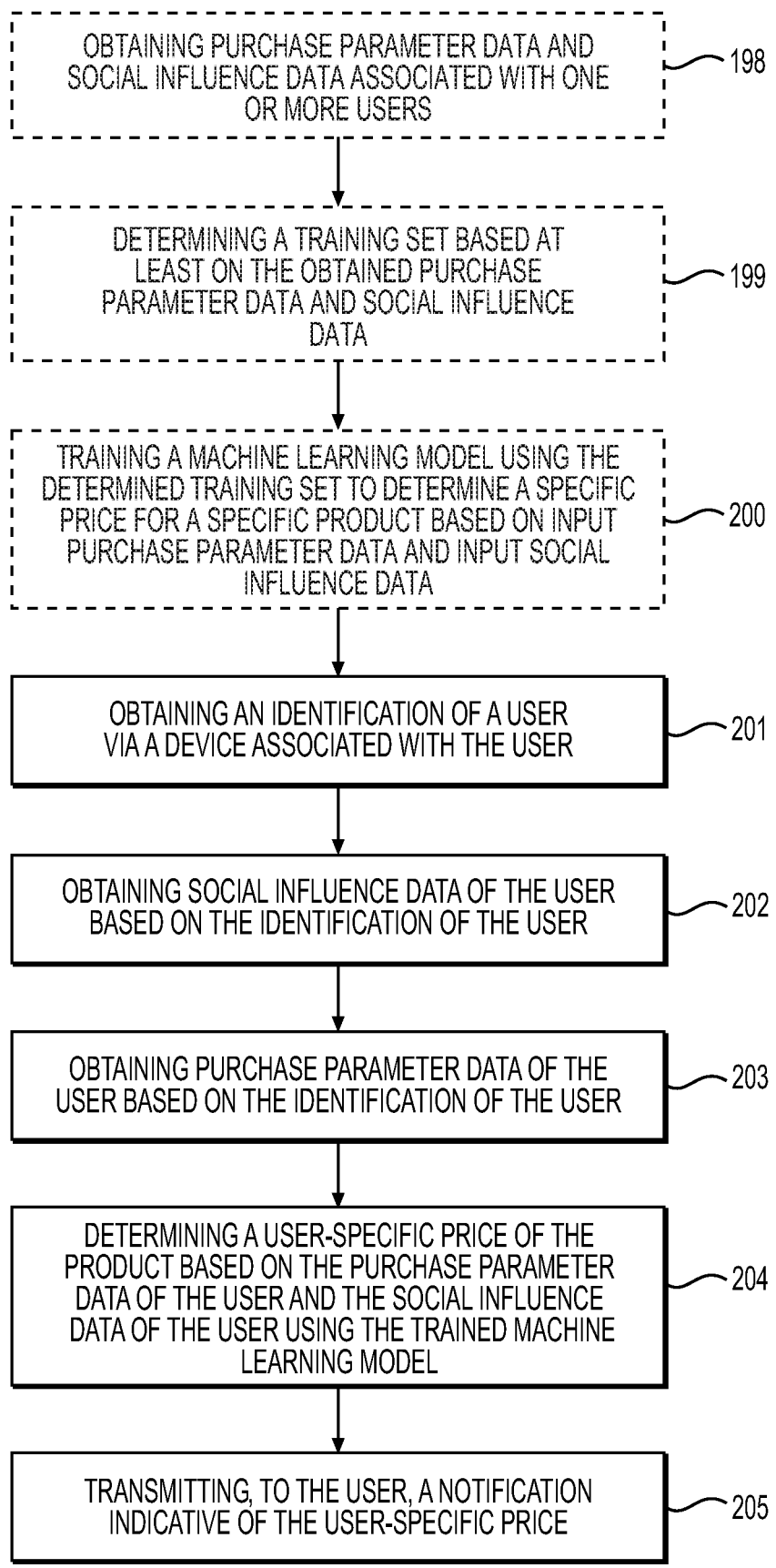
FIG. 2 depicts a flowchart of an exemplary method of negotiating a price of a product for a user, according to one or more embodiments.

FIG. 2 is a flowchart illustrating a method for negotiating a price of a product for a user, according to one or more embodiments of the present disclosure. The method may be performed by computer system 110.

Step 201 may include obtaining an identification of a user via a device associated with the user (e.g., user device 150). The identification of the user may include an actual name, a username, passwords, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user. The device associated with the user (e.g., user device 150) may include an electronic mobile device or a card.

Such a card may include one or more card components (e.g., a strip, a circuit, a chip, a token, etc.) so the card can carry out the method disclosed herein. For example, a card may include a RFID chip, and the RFID chip may interact with a reader during the process of obtaining the identification of the user. The one or more card components may store cryptographic keys (e.g., a digital signature), passwords, or biometric data (e.g., fingerprint details). The one or more card components may communicate with a reader through a USB, near-field communication (NFC), radio-frequency identification (RFID), or Bluetooth. Information stored in or associated with the card (e.g., purchase parameter data) may be encrypted and have an expiration period. Such information may be encrypted by one or more protocols including Internet Key Exchange, IPsec, Kerberos, Point to Point Protocol, Secure Shell, or Transport Layer Security. The expiration period may be at least 1 day, 1 week, 1 month, 1 quarter, 1 year or longer. In other embodiments, the expiration period may be at most 1 year, 1 quarter, 1 month, 1 week, 1 day or shorter. The card may be configured to utilize Presto technologies, which may be a password certification module for authenticating a user. Details of authenticating the user are described elsewhere herein.

Step 202 may include obtaining, via one or more processors, social influence data of the user based on the identification of the user. The social influence data may include a net promoter score, a social ranking, a social reach, an amplification score, or a network impact. A net promoter score may describe the effectiveness of a user's advertisement and/or promotion. A social ranking may represent a user's social activeness within a predetermined community (e.g., a country, a state, etc.). A social reach may describe a size of a user's engaged audience who actively engage in the user's messages. An amplification score may describe a likelihood that a user's messages may generate actions, such as "retweets", "mentions", "likes" and "comments" on one or more social network platforms. A network impact may describe a computed influence value of a user's engaged audience. The social influence data may be obtained directly through one or more online resources, such as social networks (e.g., Facebook) and online vendors (e.g., KIout). The social influence data may also be computed based on information obtained from those online sources. For instance, raw data from social networks, such as the following count, follower count, retweets, list memberships, number of spam/dead accounts following the user, and/or degree of influence of the people who retweet the user may be used to compute the social influence data.

The social influence data may be cryptographically verified by the one or more online resources 120. The social influence data may be stored via the user device 150 and/or any data storage component or memory system of the computer system 110. The social influence data can be resynced among multiple user devices if multiple user devices are used during a negotiation process. For instance, the social influence data may be resynced through an interaction between a card and an electronic mobile device (e.g. by placing a card adjacent to an electronic mobile device over a near-field communication). The stored social influence data may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The one or more online resources 120 may update social influence data periodically. The amount of social influence data that may be obtained during a negotiating process may be based on a relationship between the user and a merchant where the negotiating process is performed. For example, if a user is a loyal customer of a merchant, then all the social influence data of the user, no matter how sensitive the social influence data is, may be obtained during a negotiating process. In another example, if a user is not a loyal customer of a merchant, then not all the social influence data of the user (e.g., 50% of the social influence data) may be obtained during the negotiating process.

Step 203 may include obtaining, via one or more processors, purchase parameter data of the user based on the identification of the user. The purchase parameter data of the user may include an identification of the user, a credit score of the user, an income range of the user, a user's purchase preferences (e.g., preferences or reviews regarding favorite products and/or services, favorite department stores, etc.), and a transaction history of the user. The transaction history of the user may include a time of a transaction, a location of a transaction, spending profile of a user, incentives for user's transactions, past spending levels on goods or services sold by various manufacturers or merchants, a frequency of shopping by the user at one or more retail outlets, store loyalty exhibited by the user, how much the user spends in an average transaction, how much the user has spent on a particular collection/category of goods or services, how often the user shops in a particular store, an estimated profit margin on goods previously purchased, distances the user has traveled to purchase products in past outings, or online or offline stores at which the user has purchased items.

The obtaining the purchase parameter data of the user may include obtaining the purchase parameter data of the user from a transactional entity over a network. The transactional entity may include one or more merchants 143, financial services providers 141, or online resources 142. For instance, the computer system 110 may obtain purchase parameter data indicating payment transactions involving financial services providers 141 over a financial network. If the entity 105 operating the computer system 110 is a card issuer or other financial services provider that is involved in processing payment transactions, the computer system 110 may have access to such purchase parameter data directly or through a private network within entity 105, and may utilize such information in addition to or alternatively to information from other financial services providers 141.

The purchase parameter data may be cryptographically verified (e.g., cryptographically signed) by the transactional entity. The purchase parameter data may be stored via the user device 150 and/or any data storage component or memory system of the computer system 110. The purchase parameter data can be resynced among multiple user devices if multiple user devices are used during a negotiation process. For instance, the purchase parameter data may be resynced through an interaction between a card and an electronic mobile device (e.g. by placing a card adjacent to an electronic mobile device over a near-field communication). The stored purchase parameter data may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The transactional entity may update purchase parameter data periodically. The amount of purchase parameter data that may be obtained during a negotiating process may be based on a relationship between the user and a merchant where the negotiating process is performed. For example, if a user is a loyal customer of a merchant, then all the purchase parameter data of the user, no matter how sensitive the purchase parameter data is, may be obtained during a negotiating process. In another example, if a user is not a loyal customer of a merchant, then not all the purchase parameter data of the user (e.g., 50% of the purchase parameter data) may be obtained during the negotiating process.

Step 204 may include determining, via the one or more processors, a user-specific price of the product based on the purchase parameter data of the user and the social influence data of the user using a trained machine learning model. The machine learning model 112 may be a regression-based model that accepts the data identified in steps 201, 202, and/or 203 as input data. The machine learning model 112 may be of any suitable form, and may include, for example, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The machine learning model 112 may compute the user-specific price of the product as a function of purchase parameter data, social influence data, and/or one or more variables indicated in the input data. The one or more variables may be derived from the purchase parameter data and social influence data. Such variables may represent purchase parameter data and social influence data of an individual other than the user (e.g., a user's follower in social networks). In other embodiments, the one or more variables may not be derived from the purchase parameter data and social influence data. Such variables may represent a relationship between a user and a merchant (e.g., whether a merchant is categorized by a user as a trusted source to the user). This function may be learned by training the machine learning model 112 with training sets.

The machine learning model 112 may be trained by supervised, unsupervised, or semi-supervised learning using training sets comprising data of types similar to the type of data used as the model input. For example, the training set used to train the model 112 may include any combination of the following: purchase parameter data of a user; purchase parameter data associated with customers other than the user; social influence data of the user; or social influence data associated with customers other than user. Accordingly, the machine learning model 112 may be trained to map input variables to a value of a user-specific price of the product. That is, the machine learning model 112 may be trained to determine a value of a user-specific price of the product as a function of various input variables. Such input variables may include the purchase parameter data and social influence data. The user-specific price of the product determined by the machine learning model 112 may be used as an additional input variable.

The trained machine learning model may be configured to utilize principal component analysis (PCA). The PCA may convert a set of variables or input data into a set of values of linearly uncorrelated variables, which include a first principal component that has the largest possible variance. For example, the input data, including the purchase parameter data and social influence data, may be converted to a set of variables representing other characteristics of purchase parameter and social influence. The other characteristics of the purchase parameter and social influence may include a mood of the user during the negotiation, a life event of the user (e.g., a wedding), or a travel plan of the user. The PCA may be used to define one or more variables that are more important than other variables, or reduce the number of variables needed to be trained and computed by machine learning model 112.

In some embodiments, the machine learning model may be trained as shown in optional steps 198-200 of FIG. 2. It is understood that optional steps 198-200 may be performed in any order. For example, any one of steps 198-200 may be performed before or after any of steps 201-205 of the flowchart depicted in FIG. 2. As shown in FIG. 2, optional step 198 may include obtaining purchase parameter data and social influence data associated with one or more users, as described above. Optional step 199 may include determining a training set based at least on the obtained purchase parameter data and social influence data. For example, the training set may include any combination of the following: purchase parameter data of a user; purchase parameter data associated with customers other than the user; social influence data of the user; or social influence data associated with customers other than user, as described above. In optional step 200, the machine learning model may be trained using the determined training set to determine a specific price for a specific product based on input purchase parameter data and input social influence data.

Step 205 may include transmitting, to the user, a notification indicative of the user-specific price. The notification may allow the user to accept the user-specific price or to start re-negotiating. The notification may be configured to be displayed on a display screen of a user device (e.g., user device 150). The notification may be displayed on the display screen in any suitable form, such as an e-mail, a text message, a push notification, content on a web page, and/or any form of graphical user interface. The user device may be capable of accepting inputs of a user via one or more interactive components of the user device, such as a keyboard, button, mouse, touchscreen, touchpad, joystick, trackball, camera, microphone, or motion sensor. In some examples, if a user decides to renegotiate, steps 202-204 may be repeated until a user-specific price is accepted by the user.

Figure 3:
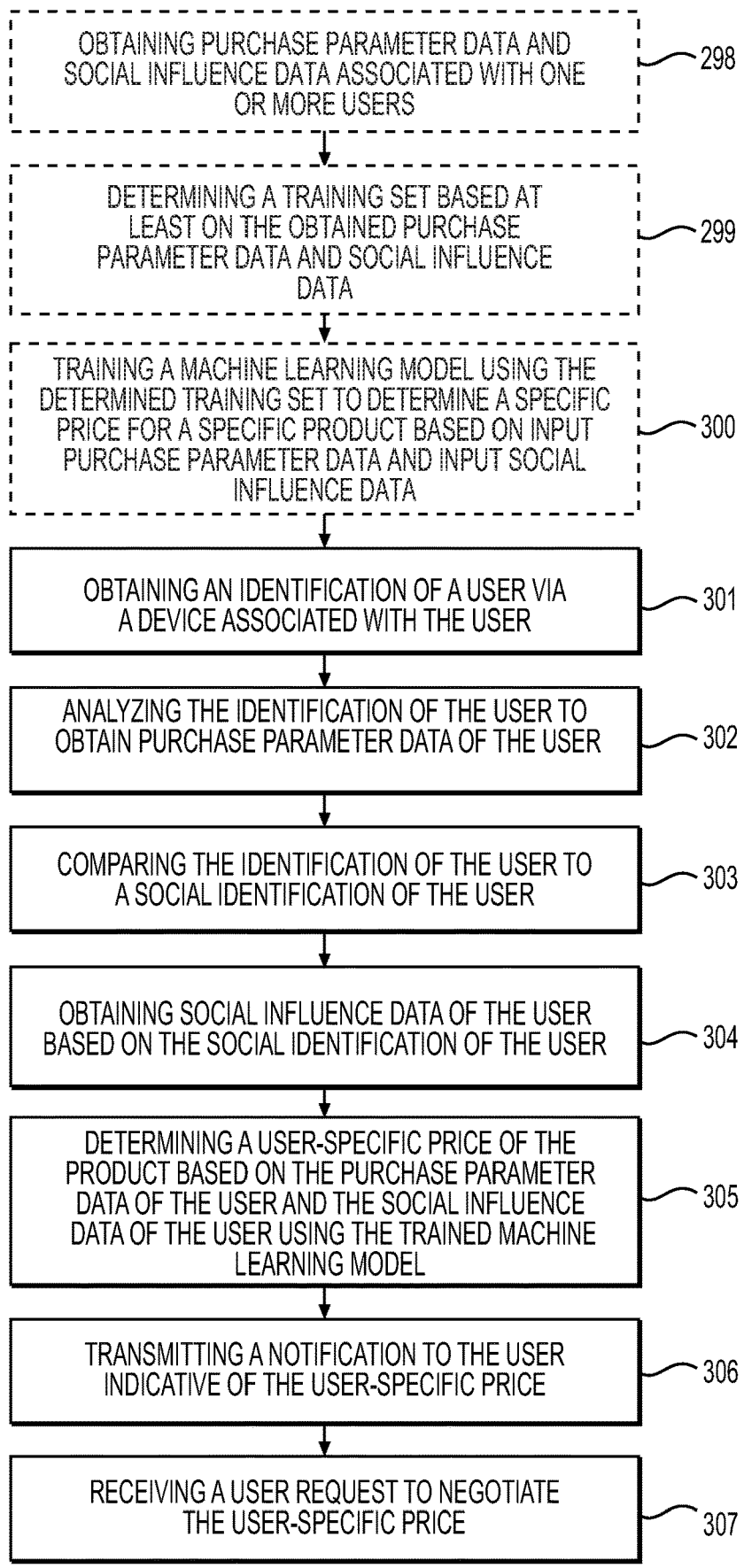
FIG. 3 depicts a flowchart of another exemplary method of negotiating a price of a product for a user, according to one or more embodiments.

FIG. 3 is a flowchart illustrating another exemplary method for negotiating a price of a product for a user, according to one or more embodiments of the present disclosure. The method may be performed by computer system 110.

Step 301 may be similar to step 201, which includes obtaining an identification of the user via a device (e.g., user device 150) associated with the user. The obtaining the identification of the user may include obtaining the identification of the user via a reader. The reader may be a near-field communication reader. A reader may communicate with user device 150 to identify a user and/or permit transactions. The reader may receive information (e.g., identification of the user) from user device 150 when user device 150 is placed adjacent to the reader. The information from user device 150 may be assessed by the reader, or another external device to verify user identity and/or permit a transaction to be processed. If the user device 150 is a card, the reader may be configured to communicate with one or more card components (e.g., a strip, a circuit, a chip, a token, etc.) of the card. The reader may be configured to accept a swiping motion of the card. The reader may include a sensing unit that may be able to detect user device 150. The sensing unit may include a proximity sensor, a radio-frequency identification tag, or a magnet. The reader may be attached to, or in proximity to, one or more products that a user plans to purchase. In other embodiments, the reader may be in proximity to a machine or personnel that processes payments on behalf of a merchant. The reader may include a reader display. The reader display may include an e-paper display, a liquid crystal display, a light-emitting diode display, a plasma display, a segment display, or a multi-dimensional display. The reader display may demonstrate any information regarding a user or a product that the user plans to purchase.

The obtaining the identification of the user may include obtaining the identification of the user based on a graphical component. The graphical component may be scanned by a user device (e.g., user device 150) having an imaging device. The imaging device may be a camera of the user device. The graphical component can be any format, such as a barcode, a picture, a sequence, or the like that can be captured and/or displayed on a user device. The graphical component may encode various types of information in any type of suitable format, such as binary, alphanumeric, or ASCII. The graphical component may have various storage capacities that can encode certain amounts of data. The graphical component may conform to known standards that can be read by standard barcode readers. In other embodiments, the graphical component may be read by an authenticated application provided by an authentication system running on a user device. The graphical component can be a one-dimensional barcode, a two-dimensional barcode, or a three-dimensional barcode.

Step 302 may comprise analyzing, via one or more processors, the identification of the user to obtain purchase parameter data of the user. The analyzing the identification of the user may be performed by an identification module (not shown) in the computer system 110. The identification module may analyze identification information for each user accessing the computer system 110. The identification information may include actual names, usernames, passwords, contact information, user preference information, demographic information, previous purchase information, and other data related to the user. The identification information may be stored to, and retrieved from, one or more components of a data storage component or memory system of the computer system 110. The identification module may retrieve other data of a user (e.g., purchase parameter data of a user) if identification of the user obtained through a user device is authenticated. Details of purchase parameter data of the user are described elsewhere herein.

Prior to step 302, or at any stage of negotiating a price for a user, there may be a step of authenticating the user based on the identification of the user. The authenticating the user may be initiated when the identification of the user is obtained. The authenticating the user may include comparing the identification of the user to a prestored identification. During the authenticating process, one or more algorithms may be used to compare the identification of the user to a prestored identification and determine whether there is a match between the identification of the user and a prestored identification. A transaction or negotiating process may be processes/completed, may be stopped, or may require additional verification processes, based on whether there is a match between the identification of the user and a prestored identification.

The prestored identification may be generated when a user device (e.g., user device 150) is registered with a transaction system, an authentication system, or a transactional entity. In other embodiments, the prestored identification may be generated when a user device first connects with a transaction system, an authentication system, or a transactional entity. If the user device is an electronic mobile device, the prestored identification may be generated when a mobile application for authenticating identification is downloaded, installed, or running on the user device for the first time. If the user device is a card, the prestored identification may be generated when information of a card is registered or entered by a user through an electronic device (e.g., a phone, a computer, etc.). The prestored identification may be generated when a user account is registered with a transaction system, an authentication system, or a transaction entity, and the prestored identification may correspond to the user device used for registration of the user account. Once the prestored identification has been generated, it may be stored with other user account information and/or authentication information. The prestored identification may be stored in one or more memory units, cookies, caches, browsing histories, and/or browser fingerprints. The prestored identification may be stored in a memory on-board the reader or on-board the user device. The prestored identification may be distributed over multiple devices or systems (e.g., peer-to-peer, cloud-computing based infrastructure, between the reader and an external device).

Step 303 may include comparing, via the one or more processors, the identification of the user to a social identification of the user. The social identification of the user may be an identification associated with social influence data of the user. The social identification may be generated when a user device is registered with one or more social networks or any online resources that connect the user to other individuals. The social identification may be generated when a social network application is downloaded, installed, or running on the user device for the first time. One or more algorithms or software may be used to map the identification of the user to a social identification of the user. In some other embodiments, a user may manually map his/her identification to his/her social identification. For example, the user may type his/her identification (e.g., address) next to a user name that he/she uses in a social website. The social identification may be updated periodically. Once the social identification has been generated, it may be stored with identification of the user. In other embodiments, the social identification may not be stored with identification of the user. The social identification may be distributed over multiple devices or systems (e.g., peer-to-peer, cloud-computing based infrastructure, between the reader and an external device).

Step 304 may include obtaining, via the one or more processors, social influence data of the user based on the social identification of the user. The social identification may be unique to a user. The social identification may be associated with another intermediate identification (e.g., a database identity or a timestamp) by any suitable cryptographic techniques so that the social identification can be used as a key to retrieve the social influence data. The social influence data may be stored in a database and can be retrieved via the unique social identification of the user. Details of the social influence data of the user are disclosed elsewhere herein.

Step 305 may be similar to step 204, which includes determining, via the one or more processors, a user-specific price of the product based on the purchase parameter data of the user and the social influence data of the user using a trained machine learning model. The user-specific price of the product may include additional offers including any incentive programs. The incentive programs may include at least one of a customer loyalty reward, an incentive to purchase the product again, an incentive to buy another product similar to the purchased product, an incentive to promote the product, a new customer incentive, a reward to switch away from another retailer or manufacturer, an incentive associated with a particular level or degree of engagement between the user and the product or brand, or a reward for a customer that has proven to be more lucrative than others. To access the incentive programs, a user may sign a contract based on the content of the incentive programs. For instance, if the incentives program includes an incentive to promote the product, then a user may sign a contract where the user agrees to promote the product on certain social websites. The contract may be displayed on a user device or a reader.

The user-specific price of the product may be less than an original price of the product. In some embodiments, the user-specific price of the product may be at most 90%, 80%, 70%, 60%, 50%, 40%, 30%, 20% or less of the original price of the product. In other embodiments, the user-specific price of the product may be at least 10%, 20%, 30%, 40%, 50%, 60%, 70%, 80% or more of the original price of the product. In yet other embodiments, the user-specific price may be negative. In this situation, the user may receive money from the merchant for purchasing the product. A user-specific price of a product may be applied at a point of sale of the product. In other embodiments, a user may pay an original price of a product at the point of sale, and the difference between the original price and the user-specific price may be paid back to the user through a user device after the transaction is completed.

The user-specific price of the product may be stored for subsequent analysis. The stored user-specific price of the product may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the user-specific price of the product to update the identification of the user, the purchase parameter data, the social identification, or the social influence data. The user-specific price may also be one of the one or more variables used in training a trained machine learning model (e.g., machine learning model 112). Details of the trained machine learning model are described elsewhere herein.

In some embodiments, the machine learning model may be trained as shown in optional step 298-300 of FIG. 3. It is understood that optional steps 298-300 may be performed in any order. For example, any one of steps 298-300 may be performed before or after any of steps 301-307 of the flowchart depicted in FIG. 3. As shown in FIG. 3, optional step 298 may include obtaining purchase parameter data and social influence data associated with one or more users, as described above. Optional step 299 may include determining a training set based at least on the obtained purchase parameter data and social influence data. For example, the training set may include any combination of the following: purchase parameter data of a user; purchase parameter data associated with customers other than the user; social influence data of the user; or social influence data associated with customers other than user, as described above. In optional step 300, the machine learning model may be trained using the determined training set to determine a specific price for a specific product based on input purchase parameter data and input social influence data.

Step 306 may be similar to step 205, which includes transmitting, via the one or more processors, a notification to the user indicative of the user-specific price. The notification may include a user-specific price of the product. The notification may be configured to be displayed on a display screen of a user device or a display screen of a reader (e.g., a near-field communication reader). The notification may be displayed for a period of time on the display screen. The period of time may be at most 1 hour, 10 minutes, 1 minute or shorter. In other embodiments, the period of time may be at least 1 minute, 10 minutes, 1 hour or longer.

Step 307 may include receiving, via the one or more processors, a user request to negotiate the user-specific price. A user may request to renegotiate the user-specific price if the user is not satisfied with the user-specific price. Upon receiving the user request to renegotiate, steps 302-306 may be repeated one or more times until the user accepts the user-specific price.

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 4:
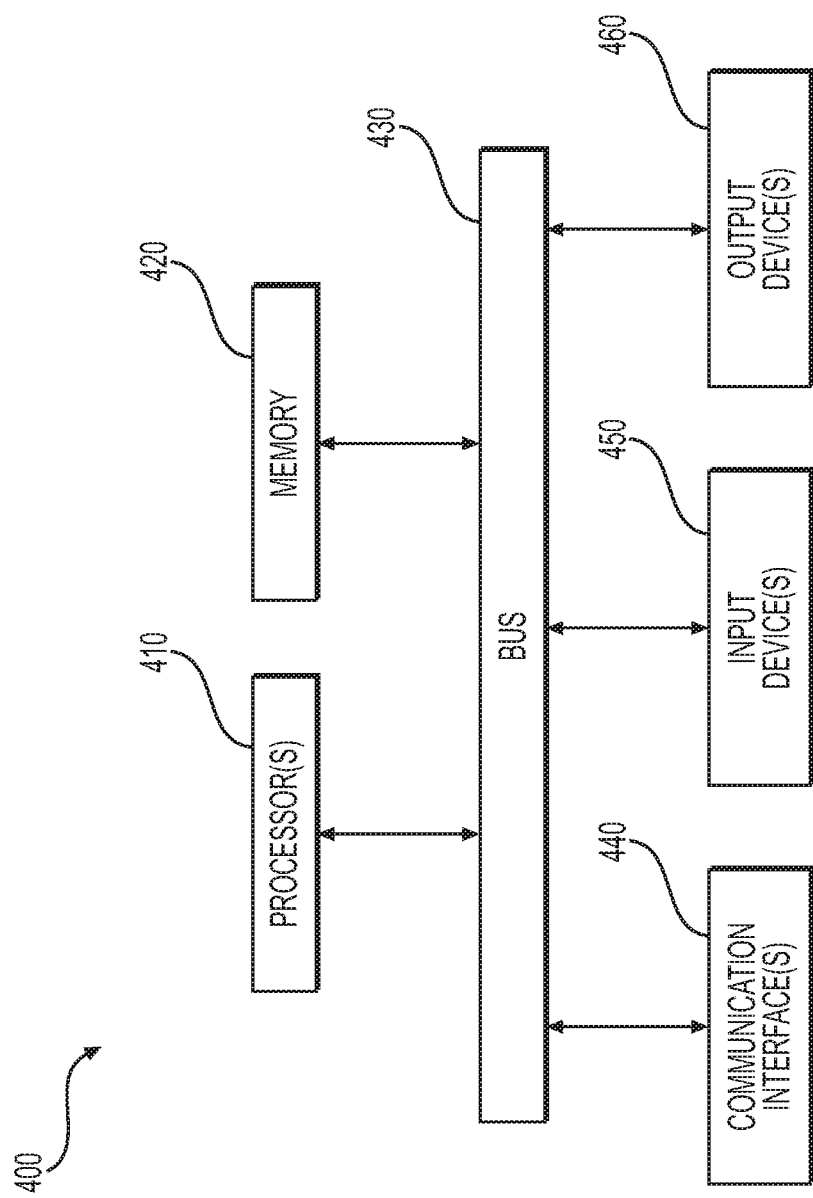
FIG. 4 depicts an example of a computing device, according to one or more embodiments.

FIG. 4 illustrates an example of a computing device 400 of a computer system, such as computer system 110. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for negotiating a price of a product for a user, the method comprising:
   obtaining, by one or more processors, an identification of the user from a user device associated with the user, wherein:
   the identification of the user comprises one or more of an actual name, a social security number, or a phone number associated with the user; and
   the user device is one of:
   a near-field communication (NFC) card, wherein the identification of the user is obtained from a scan of a component of the NFC card by an electronic reader; or
   an electronic mobile device, wherein the identification of the user is obtained from a scan of a graphical component by a camera of the electronic mobile device;

determining, by the one or more processors, whether the user is authenticated by comparing the identification of the user with a prestored identification;
upon determining that the user is authenticated, obtaining, by the one or more processors, raw data from one or more social networks associated with the user, wherein the raw data comprises one or more of:
retweets;
list or group memberships;
quantity of spam or dead accounts following the user; or
degree of influence of people who retweet user;
generating, by the one or more processors, social influence data associated with the user based on the raw data, wherein the social influence data comprises one or more of:
a net promoter score;
a social ranking;
a social reach;
an amplification score; or
a network impact;
based on the identification of the user, obtaining, by the one or more processors, purchase parameter data associated with the user, wherein the purchase parameter data comprises one or more of:
a credit score associated with the user; or
an income range of the user;
determining, by the one or more processors, using a trained machine learning model, a user-specific price of a product based on the purchase parameter data of the user and the social influence data of the user, wherein:
the trained machine learning model is trained, using supervised, un-supervised, or semi-supervised learning, based on (i) training user data that includes information regarding purchase parameter data and social influence data associated with persons other than the user; and (ii) training price data that includes user-specific prices for one or more products associated with the persons other than the user, to learn relationships between the training user data and the training price data, such that the trained machine learning model is configured to determine a user-specific price of a product for a user upon input of the purchase parameter data of the user and the social influence data of the user; and
the trained machine learning model is configured to utilize principal component analysis; and
the determined user-specific price of a product is stored for a period of time and expires after the period of time, and during the period of time, the determined user-specific price of the product is available for further analysis; and
transmitting, to the user, a notification indicative of the user-specific price.

2. The method of claim 1, wherein the user-specific price of the product includes additional offers including at least one of a customer loyalty reward, an incentive to purchase the product again, or an incentive to promote the product.

3. The method of claim 1, further including storing the user-specific price of the product for subsequent analysis.

4. The method of claim 1, wherein the notification is configured to be displayed on a display screen of the electronic mobile device.

5. The method of claim 1, wherein the obtaining the purchase parameter data associated with the user includes obtaining the purchase parameter data of the user from a transactional entity over a network.

6. The method of claim 5, wherein the transactional entity is a financial services providers.

7. The method of claim 1, wherein the user device is the NFC card, and wherein the electronic reader is associated with a product.

8. The method of claim 1, wherein the user device is the NFC card and includes a radio-frequency identification (RFID) chip.

9. The method of claim 1, wherein the purchase parameter data is obtained from a scan of a component of the NFC card by an electronic reader after determining that the user is authenticated.

10. A computer-implemented method for negotiating a price of a product for a user, the method comprising:
obtaining, by one or more processors, an identification of the user from a user device associated with the user, wherein:
the identification of the user comprises one or more of an actual name, a social security number, or a phone number associated with the user; and
the user device is one of:
an NFC card, wherein the identification of the user is obtained from a scan of a component of the NFC card by an electronic reader; or
an electronic mobile device, wherein the identification of the user is obtained from a scan of a graphical component by a camera of the electronic mobile device;
determining, by the one or more processors, whether the user is authenticated by comparing the identification of the user with a prestored identification;
upon determining that the user is authenticated, obtaining, by the one or more processors, raw data from one or more social networks associated with the user, wherein the raw data comprises one or more of:
retweets;
list or group memberships;
quantity of spam or dead accounts following the user; or
degree of influence of people who retweet user;
generating, by the one or more processors, social influence data associated with the user based on the raw data, wherein the social influence data comprises one or more of:
a net promoter score;
a social ranking;
a social reach;
an amplification score; or
a network impact;
based on the identification of the user, obtaining, by the one or more processors, purchase parameter data associated with the user, wherein the purchase parameter data comprises:
a credit score associated with the user; and
an income range of the user;
determining, by a trained machine learning model, a user-specific price of the product based on the purchase parameter data of the user and the social influence data of the user, wherein:
the trained machine learning model has been trained using supervised, un-supervised, or semi-supervised learning, to determine one or more user-specific prices for one or more products, based on (i) training user data that includes information regarding purchase parameter data and social influence data associated with persons other than the user; and (ii) training price data that includes user-specific prices for one or more products associated with the persons other than the user, to learn relationships between the training user data and the training price data, such that the machine learning model is configured to determine a user-specific price of a product for a user upon input of the purchase parameter data of the user and the social influence data of the user; and the determined user-specific price of a product is stored for a period of time and expires after the period of time;

transmitting, via the one or more processors, a notification to the user indicative of the user-specific price; and receiving, via the one or more processors, a user request to negotiate the user-specific price.

11. The method of claim 10, wherein the user-specific price of the product includes additional offers including at least one of a customer loyalty reward, an incentive to purchase the product again, or an incentive to promote the product.

12. The method of claim 10, further including storing the user-specific price of the product for subsequent analysis.

13. The method of claim 10, wherein the user-specific price of the product is less than an original price of the product.

14. The method of claim 10, wherein the notification is configured to be displayed on a display screen of the electronic mobile device associated with the user.

15. The method of claim 10, wherein the user device is the NFC card, and wherein the electronic reader is associated with a product.

16. The method of claim 10, wherein the user device is the NFC card and includes a radio-frequency identification (RFID) chip.

17. The method of claim 10, wherein the purchase parameter data is obtained from a scan of a component of the NFC card by an electronic reader after determining that the user is authenticated.

18. The method of claim 10, wherein the obtaining the purchase parameter data associated with the user includes obtaining the purchase parameter data of the user from a transactional entity over a network.

19. The method of claim 18, wherein the transactional entity is a financial services providers.

20. A computer system for negotiating a price of a product for a user, comprising:

a memory storing instructions; and one or more processors configured to execute the instructions to perform operations including:

obtaining an identification of the user from a user device associated with the user, wherein:

the identification of the user comprises one or more of a social security number or a phone number associated with the user; and the user device is one of:

a near-field communication (NFC) card, wherein the identification of the user is obtained from a scan of a component of the NFC card by an electronic reader; or an electronic mobile device, wherein the identification of the user is obtained from a scan of a graphical component by a camera of the electronic mobile device;

determining whether the user is authenticated by comparing the identification of the user with a prestored identification;

upon determining that the user is authenticated, obtaining raw data from one or more social networks associated with the user, wherein the raw data comprises one or more of:

retweets;

list or group memberships;

quantity of spam or dead accounts following the user; or degree of influence of people who retweet user;

generating, by the one or more processors, social influence data associated with the user based on the raw data, wherein the social influence data comprises one or more of:

a net promoter score;

a social ranking;

a social reach;

an amplification score; or a network impact;

based on the identification of the user, obtaining, from a financial services providers, purchase parameter data associated with the user, wherein the purchase parameter data comprises one or more of:

a credit score associated with the user; or an income range of the user;

determining, using a trained machine learning model, a user-specific price of the product based on the purchase parameter data of the user and the social influence data of the user, wherein:

the trained machine learning model is trained, using supervised, un-supervised, or semi-supervised learning, based on (i) training user data that includes information regarding purchase parameter data and social influence data associated with persons other than the user; and (ii) training price data that includes user-specific prices for one or more products associated with the persons other than the user, to learn relationships between the training user data and the training price data, such that the trained machine learning model is configured to determine a user-specific price of a product for a user upon input of the purchase parameter data of the user and the social influence data of the user; and the trained machine learning model is configured to utilize principal component analysis;

the determined user-specific price of a product is stored for a period of time and expires after the period of time; and transmitting, to the user, a notification indicative of the user-specific price.

* * * * *